Figure 1:
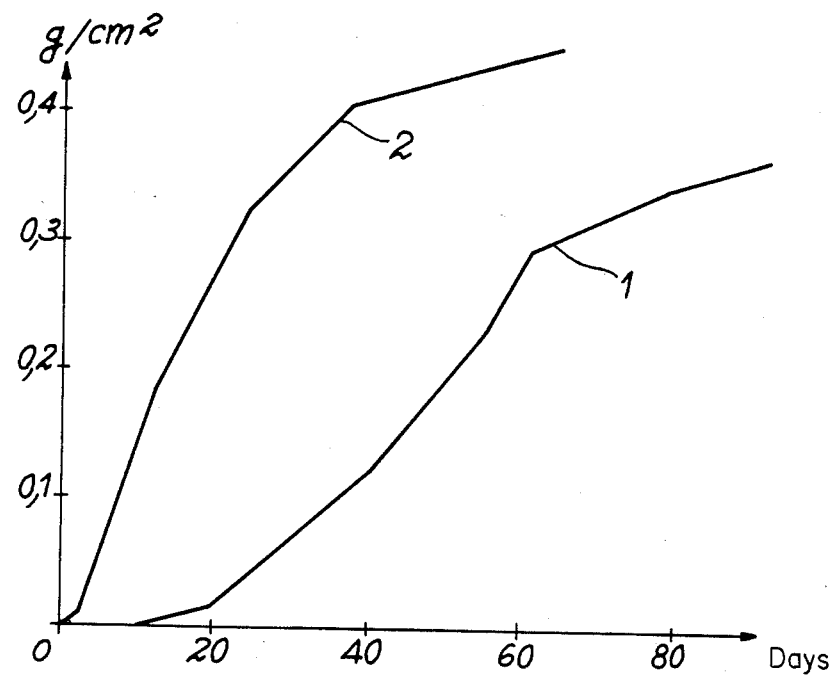
Figure 2:
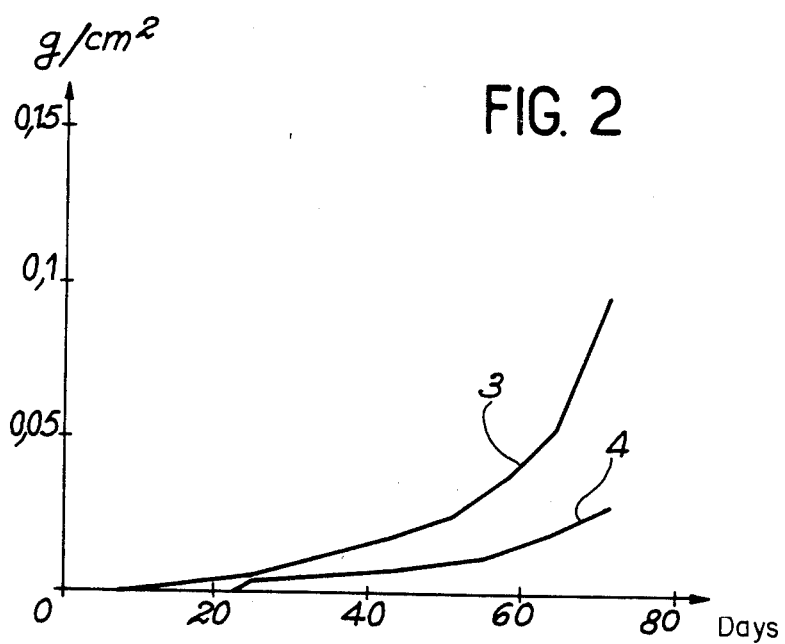

United States Patent [19]

Berthet et al.

[11] Patent Number: 4,557,749

[45] Date of Patent: Dec. 10, 1985

[54] CONDITIONING DEVICE FOR HYDROSOLUBLE FERTILIZERS AND/OR OTHER PRODUCTS

[75] Inventors: Jeanne Berthet, Velizy Villacoublay; Marie-Francoise Blin, Versailles; Gilbert Gaussens, Meudon; Jean R. Noaillac, Athis-Mons, all of France

[73] Assignee: Commissariat a l'Energie Atomique, Paris, France

[21] Appl. No.: 420,907

[22] Filed: Sep. 21, 1982

[30] Foreign Application Priority Data

Sep. 24, 1981 [FR] France ................................ 81 18012

[51] Int. Cl.$^4$ ................................................ C05G 3/04
[52] U.S. Cl. .................................... 71/64.11; 47/48.5; 47/57.5; 522/116; 522/120; 521/139; 523/122; 525/283; 525/301; 424/DIG. 7
[58] Field of Search ................. 523/122; 424/DIG. 7; 604/892; 47/48.5, 57.5; 71/64.11; 521/139; 525/301, 283

[56] References Cited

U.S. PATENT DOCUMENTS

| | | | |
|---|---|---|---|
| 1,971,390 | 8/1934 | Yahres | 47/48 |
| 2,145,934 | 2/1939 | Kingman | 47/48 |
| 2,380,721 | 7/1945 | Brigden | 47/48.5 |
| 2,759,300 | 8/1956 | Hartley | 47/58 |
| 2,931,140 | 4/1960 | Laffler et al. | 47/48.5 |
| 3,059,379 | 10/1962 | Attoe | 47/48.5 |
| 3,137,674 | 6/1964 | Marans | 525/283 |
| 3,579,476 | 5/1971 | Rieke et al. | 260/41 |
| 3,752,868 | 8/1973 | Kaku | 525/283 |
| 3,934,580 | 1/1976 | Cournut | 128/130 |
| 3,970,534 | 7/1976 | Fujiwara | 521/27 |
| 3,985,840 | 10/1976 | Hofacker | 424/DIG. 7 |
| 4,127,127 | 11/1978 | Wong | 604/892 |
| 4,131,637 | 12/1978 | Bernstein | 525/283 |
| 4,137,137 | 1/1979 | Machi | 521/27 |
| 4,220,153 | 9/1980 | Dresback | 604/892 |
| 4,289,815 | 9/1981 | Lee | 604/892 |
| 4,370,450 | 1/1983 | Grigo | 525/301 |
| 4,423,099 | 12/1983 | Mueller | 424/DIG. 7 |

FOREIGN PATENT DOCUMENTS

| | | |
|---|---|---|
| 27756 | 11/1883 | Fed. Rep. of Germany . |
| 832358 | 1/1952 | Fed. Rep. of Germany . |
| 1255947 | 11/1959 | France . |
| 1395993 | 4/1964 | France . |
| 2121831 | 8/1972 | France . |
| 0001137 | 1/1963 | Japan .................... 71/64.11 |
| 0138870 | 12/1978 | Japan .................... 71/64.11 |
| 881374 | 11/1961 | United Kingdom ........ 525/283 |
| 1535854 | 12/1978 | United Kingdom . |

OTHER PUBLICATIONS

Chem. Abstr. vol. 84, ref. 74 888 b.

Primary Examiner—C. Warren Ivy
Attorney, Agent, or Firm—Pearne, Gordon, Sessions, McCoy, Granger & Tilberry

[57] ABSTRACT

Device for conditioning hydrosoluble fertilizers and/or hydrosoluble products usable in agriculture, wherein it comprises a sealed container, whereof at least one of the walls is constituted by a hydrophobic polymer diaphragm having hydrophilic inclusions, said container containing the fertilizers and/or products.

A process for preparing a hydrophobic polymer diaphragm containing hydrophilic inclusions and usable in the conditioning device consists of preparing a hydrophobic polymer powder grafted by hydrophilic monomers and bringing this powder into the form of a diaphragm by different processes performed hot.

12 Claims, 5 Drawing Figures

CONDITIONING DEVICE FOR HYDROSOLUBLE FERTILIZERS AND/OR OTHER PRODUCTS

BACKGROUND OF THE INVENTION

The present invention relates to a device for conditioning hydrosoluble fertilizers and/or other hydrosoluble products usable in agriculture, in pisciculture for the treatment of diseases, disinfection, the supply of nutrients, etc., as well as the treatment of ornamental lakes (fungicides, disinfectants), which makes it possible to obtain a programmed desorption of the fertilizers and/or products in the medium to be fertilized or treated.

For some years now research has been directed at providing delayed action fertilizers, which can be progressively released into the medium to be fertilized. This research has led to the production of concentrated granular fertilizers in which around the very small fertilizer granules are formed one or more coatings based on hydrophobic materials, such as soya alkyd resins and phenol formaldehyde resins. French Pat. Nos. 1 279 110 and 1 419 969 illustrate the preparation of such products by spraying finishing coatings and complementary coatings on to fertilizer granules or powder. This procedure makes it possible to influence the speed of release of the fertilizer by appropriately choosing the number and nature of the different coatings which are successively applied. However, it is difficult to regulate to an appropriate value and for an extended time the amount of fertilizer which is released. Moreover, the preparation of these products necessitates complex installations and is difficult to realize.

BRIEF SUMMARY OF THE INVENTION

The object of the present invention is a device for conditioning hydrosoluble fertilizers or other hydrosoluble products (herbicides, fungicides, insecticides, etc.) usable in agriculture, pisciculture for the treatment of diseases, disinfection, the supply of nutrients, etc., as well as for the treatment of ornamental lakes (fungicides, disinfectants), which obviates the disadvantages of the hitherto known products.

The present invention therefore specifically relates to a device for conditioning hydrosoluble fertilizers and/or hydrosoluble products usable in agriculture, wherein it comprises a sealed container, whereof at least one of the walls is constituted by a hydrophobic polymer diaphragm having hydrophilic inclusions, said container containing the fertilizers and/or products.

Due to the presence in the said container of a hydrophobic polymer diaphragm having hydrophilic inclusions, water can penetrate by capillarity into the container by following the path of the hydrophilic inclusions, which are able to absorb water. When water comes into contact with the fertilizer or the other products present in the container, it dissolves the latter and the solution obtained is then desorbed by the diaphragm into the medium to be treated, where it releases a certain quantity of fertilizer or other products.

Thus, use is made of the permeability to water properties of the hydrophobic—hydrophilic polymer diaphragm to ensure the progressive, controlled release of the fertilizer and/or other products present in the container.

Moreover, the conditioning device according to the invention has the advantage that it can be easily produced in various forms such as sachets, pots, tubes and the like, which may contain a relatively large amount of fertilizer and/or other products for agriculture.

According to the invention, the diaphragm is advantageously made from hydrophobic polymer grafted by hydrophilic monomers.

Hydrophobic polymers which can be used are polyolefins and copolymers of olefins, e.g. polyethylene, polypropylene and their copolymers, such as ethylene—vinyl acetate copolymer.

Hydrophilic monomers which can be used are acrylic acid and vinyl pyrrolidone.

In the conditioning device according to the invention, the desorption kinetics of the fertilizer and/or other products is in particular dependent on the chemical nature of the hydrophobic and hydrophilic constituents of the diaphragm, the quantity of hydrophilic inclusions and the thickness of the diaphragm.

In general, in order to obtain satisfactory desorption rates, the quantity of hydrophilic inclusions in the diaphragm is 25 to 50% by weight compared with the weight of the hydrophobic polymer and the thickness of the film is 0.1 to 0.2 mm. However, reduced thicknesses can be used, provided that an adequate strength of the diaphragm is ensured. In addition, it is possible to use thicker diaphragms, if it is proved that the desorption kinetics remain satisfactory for the envisaged use.

According to the invention, the conditioning device can be in the form of pots, sachets or tubes.

In the case of pots, the bottom of the pot and its sides can be made from high density polyethylene having e.g. a thickness of 0.8 mm, only the upper face thereof being made from hydrophobic polymer with hydrophilic inclusions. Such pots can have the following dimensions: length 35 mm, width 10 mm, depth 15 mm, with a 2.5 mm rim and thus contain 2.5 to 4.5 g of fertilizer.

In the case of sachets, the latter are conventionally completely made from hydrophobic polymer having hydrophilic inclusions and the sachets can be square, rectangular or elongated as a function of the intended use and contain 2.5 to 10 g of fertilizer.

These sachets, tubes or pots can contain different types of fertilizers, particularly previously dosed mixtures for the purpose of providing the nutrient substances necessary for cultivation. Moreover, they may contain other agriculturally usable products such as herbicides, pesticides, etc. In certain cases, particularly when the conditioned fertilizer is based on phosphate or nitrate, it is also possible to introduce into the conditioning device ammonia or an aqueous solution of ammonium salt, which facilitates the diffusion of the fertilizer through the diaphragm.

The conditioning devices according to the invention are particularly advantageous for the fertilization of cultures in pots, particularly when they are in the form of sachets or receptacles. They are also suitable for cultivating trees in containers, particularly when they are in the form of tubes adapted into direct fertilization by introduction into the trunk of the tree.

The invention also relates to a process for producing a diaphragm made from hydrophobic polymer and having hydrophilic inclusions usable in the aforementioned conditioning device.

The process consists of preparing a hydrophobic polymer powder grafted by hydrophilic monomers and bringing the thus grafted hydrophobic polymer powder into the form of a diaphragm or membrane by different processes performed hot.

Thus, to obtain a hydrophobic diaphragm in which hydrophilic inclusions are homogeneously distributed through its entire thickness in order to permit a good exchange between the interior and exterior of the conditioning device, it is preferable to graft the hydrophilic monomer to a hydrophobic polymer powder. In general, a hydrophobic polymer powder having an average grain size of 5 to 1000 μm is used.

Although grafting can be carried out by any known process, e.g. chemically, it is preferably performed by irradiation with ionizing rays, such as X-rays, gamma rays, ultraviolet rays or electron beams.

According to an embodiment of this process, the grafted hydrophobic polymer powder is prepared by irradiating with ionizing rays a hydrophobic polymer powder and then immersing the this irradiated powder in a solution of hydrophilic monomers containing a polymerization inhibitor.

In this case, the powder is oxidized by irradiation in air, generally under accelerated electron beams and when it is then brought into contact with a solution of monomers, the monomers are grafted to powder. In order to regulate to an appropriate value the grafting degree of the hydrophilic monomers, action takes place on the irradiation dose applied and on the temperature and duration during which the powder is brought into contact with the solution of hydrophilic monomers. When irradiation is carried out by means of accelerated electron beams, it is conventional practice to use an electron beam having an energy of 2 to 3 MeV and an intensity of 200 to 600 microamperes and the applied dose is 0.6 to 4 Mrad. Following irradiation the peroxidized hydrophobic polymer powder is immersed in a solution of monomers raised to a temperature of 40° to 90° C. for 2 to 17 hours, whilst working in a nitrogen atmosphere. The monomer solution contains a polymerization inhibitor in order to prevent homopolymerization of the dissolved monomer.

According to another embodiment of the process according to the invention, the grafted hydrophobic polymer powder is prepared by the direct method, i.e. by irradiating with ionizing rays a hydrophobic polymer powder immersed in a hydrophilic monomer solution containing a polymerization inhibitor.

In this case, working generally takes place under nitrogen by agitating the powder contained in the solution and irradiation is preferably carried out by gamma rays at a dose rate of 0.04 to 0.08 Mrad/h and a dose of 0.8 to 1.5 Mrad. The composition of the solution is chosen as a function of the hydrophobic polymer powder quantity and the desired grafting degree. In general, an aqueous solution containing a quantity of soft water corresponding to 2.6 times the hydrophobic polymer powder weight is used, together with a monomer quantity representing 1.05 to 1.1 times the theoretical weight of the monomers which it is desired to graft and a polymerization inhibitor quantity representing 5 to 7% by weight of the monomers in solution.

In order to regulate to a desired value the grafting degree of the hydrophilic monomers, action takes place on the temperature and monomer concentration of the solution, the irradiation dose rate and the irradiation time. In the same way, working takes place in the presence of a polymerization inhibitor in order to prevent homopolymerization of the dissolved monomer.

After grafting, the powder obtained is filtered or suction filtered, washed in water, generally at a temperature of 90° C., then dried in the vacuum oven until a constant weight is obtained. Determination then takes place of the grafting degree (in %) which corresponds to $$(P_f - P_i)/P_i \times 100$$

with $P_f$ representing the graft powder weight and $P_i$ the powder weight before grafting.

The thus obtained grafted powder is then brought into the form of a diaphragm or membrane by hot forming, e.g. by calendering after homogenization in a mixer, by hot compression, or by extrusion, whilst working at a temperature chosen as a function of the treated powder.

To obtain a flat diaphragm of thickness 0.1 to 0.2 mm, it is possible to carry out hot compression at a temperature of 150° to 200° C. under a pressure of 5 to 6 bars. When it is desired to obtain tubes having e.g. an external diameter of 16 mm and a thickness of 0.1 to 0.2 mm, it is possible to work by extrusion at 130° to 200° C.

In certain cases, after the hot forming operation, the diaphragm obtained undergoes crosslinking, accompanied by irradiation by ionizing rays.

This treatment makes it possible to act on the absorption and desorption properties of the diaphragm. Thus, it leads to a narrowing or constriction of the macromolecular network of the diaphragm, which has the effect of delaying water absorption and also reducing the desorption rate of the fertilizer solution.

Crosslinking is generally carried out by irradiating the diaphragm with ionizing rays, like those used for grafting, the radiation dose to which the diaphragm is exposed, is adapted as a function of the desired crosslinking level.

In certain cases irradiation is carried out after immersing the diaphragm in a solution of polyunsaturated monomers, such as diacrylates and dimethacrylates of polyethylene glycol, diethylene glycol, triethylene glycol or tetraethylene glycol, divinyl benzene, 1,3-butylene glycol diacrylate, 1,3-butylene glycol dimethyacrylate, trimethyl propane triacrylate and trimethacrylate, ethylene diacrylate and dimethacrylate, 1,6-hexamethylene diacrylate and dimethacrylate.

Following these different operations, the thus obtained hydrophobic—hydrophilic diaphragms are used for producing the conditioning devices according to the invention.

To this end, the hydrophobic—hydrophilic diaphragms are assembled with one another or with other elements to form the container to receive the desired fertilizer quantity, without however sealing it completely. The container is then filled with fertilizer and/or other products usable in agriculture. The container is then sealed by using either a hydrophobic—hydrophilic diaphragm, or some other element.

When conditioning is to take place in the form of pots having a length of e.g. 35 mm, a width of 10 mm and a depth of 15 mm, with a 2.5 mm rim, thermoforming takes place from high density polyethylene sheets with a thickness of 0.8 mm. The desired quantity of fertilizer is then introduced into the pot and the latter is sealed by forming the upper part with a hydrophobic—hydrophilic diaphragm fixed by heat sealing or welding to the rim of the pot.

When it is desired to produce containers in the form of sachets containing 2.5 to 10 g of fertilizer, the hydrophobic—hydrophilic diaphragms are assembled with one another by heat sealing or welding, whilst leaving part free to fill the sachet and the latter is sealed by heat sealing or welding after filling it with the desired quantity of fertilizer.

When the container is in the form of a tube with a diameter of e.g. 1.6 cm, the ends of the tube are sealed by heat sealing or welding, after filling the latter with the desired quantity of fertilizer.

DESCRIPTION OF THE DRAWINGS AND PREFERRED EXEMPLIFIED EMBODIMENTS

The invention is described in greater detail hereinafter relative to non-limited exemplified embodiments and with reference to the attached drawings, wherein show:

FIGS. 1 to 5: diagrams representing the quantities of substance released (in g/cm$^2$ of diaphragm) by different conditioning devices according to the invention, as a function of time (in days).

EXAMPLE 1

This example relates to the production of a conditioning device in the form of a sachet containing urea, produced from polyethylene grafted with acrylic acid. 250 g of a polyethylene powder sold under the trade mark LOTRENE UA 4000 with an average grain size of 5 to 20 μm is exposed to irradiation by a beam of accelerated electrons having an energy of 2 MeV, a beam intensity of 600 μA and an irradiation dose of 3.3 Mrad. LOTRENE UA 4,000 has a fluidity index of 3.2–5.0 g/min. measured according to NF-T 51-016, a specific weight at 23° C. of 917 kg/m$^3$ and a softening temperature of 83° C. measured according to the VICAT test.

Following irradiation, the 250 g of peroxidized polyethylene powder are immersed in 1.2 liters of a 22 g/l of an aqueous solution of Mohr's salt (polymerization inhibitor) to which is added 125 ml of acrylic acid. The mixture is raised to a temperature of 74° C., under a nitrogen atmosphere for 3 hours, then the powder is separated from the solution, washed and dried. It is then weighed to determine the grafting degree, which is 27%.

The grafted powder is then brought into the form of a 0.2 mm thick diaphragm by means of a press at a temperature of 150° C. and under a pressure of 5 bars. From the thus obtained diaphragm are produced sachets having a side dimension of 3.5 cm and which are filled with 10 g of urea, followed by sealing by welding. The thus obtained receptacles have a diaphragm surface of 20 cm$^2$.

The properties of the thus obtained containers are checked by immersing them in 250 ml of demineralized water at a temperature of 25° C. and by periodically determining the urea quantity released into the water. The results obtained are illustrated by curve 1 in FIG. 1, which represents the released urea quantity (in g/cm$^2$ of diaphragm) as a function of the time (in days).

EXAMPLE 2

In the same way as in Example 1, two sachets made from polyethylene grafted with 27% acrylic acid. The diaphragm surface is 20 cm$^2$ and the thickness is 0.1 mm. 10 g of potassium phosphate is introduced into one sachet and 10 g of calcium nitrate into the other sachet.

Their properties are then checked by carrying out desorption by immersing each sachet in 250 ml of demineralized water at 40° C. The results obtained are illustrated by curves 3 and 4 in FIG. 2, which respectively show the potassium phosphate quantity (curve 3) and the calcium nitrate quantity (curve 4) released per cm$^2$ of diaphragm as a function of time (in days).

EXAMPLE 3

250 g of polyethylene powder identical to that of Example 1 are irradiated with an accelerated electron beam having an energy of 3 MeV, a beam intensity of 400 μA, and using an irradiation dose of 1.9 Mrad. Following irradiation, the powder is immersed in an acrylic acid solution identical to that of Example 1, which is heated to 93° C. for 16 hours, under a nitrogen atmosphere. In this way polyethylene powder grafted with 50% acrylic acid is obtained.

From this powder is prepared a 0.2 mm thick diaphragm, using a press at a temperature of 160° C. and under a pressure of 5.7 bars. Sachets identical to those of Example 1 are prepared from this diaphragm and contain 10 g of urea, the diaphragm surface being 20 cm$^2$.

The properties of the thus obtained containers are checked by carrying out the desorption of the urea under the same conditions as in Example 1. The results obtained are illustrated by curve 2 of FIG. 1, which represents the released urea quantity (in g/cm$^2$ of diaphragm) as a function of time. By comparing curves 1 and 2 of FIG. 1, it can be seen that the urea is released faster when the acrylic acid level of the diaphragm increases.

EXAMPLE 4

Figure 3:
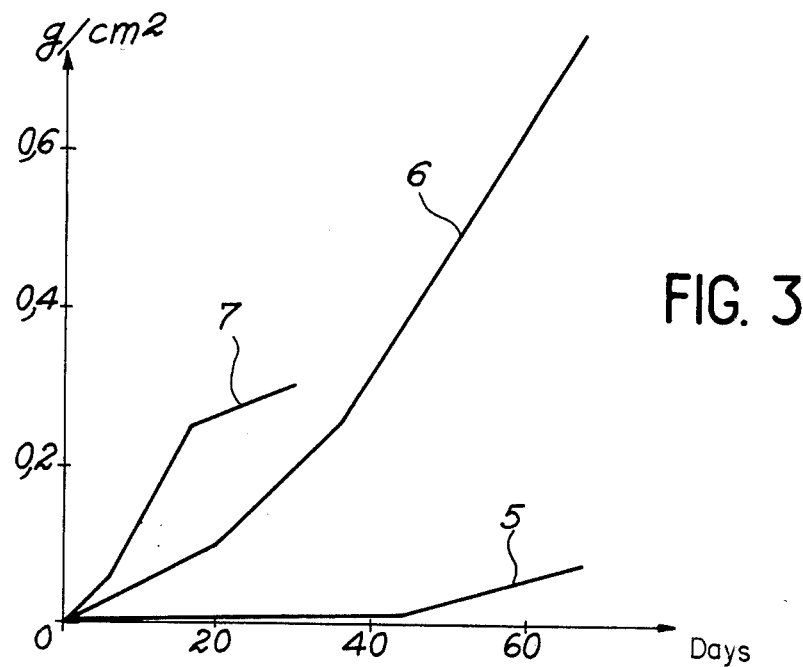
Figure 4:
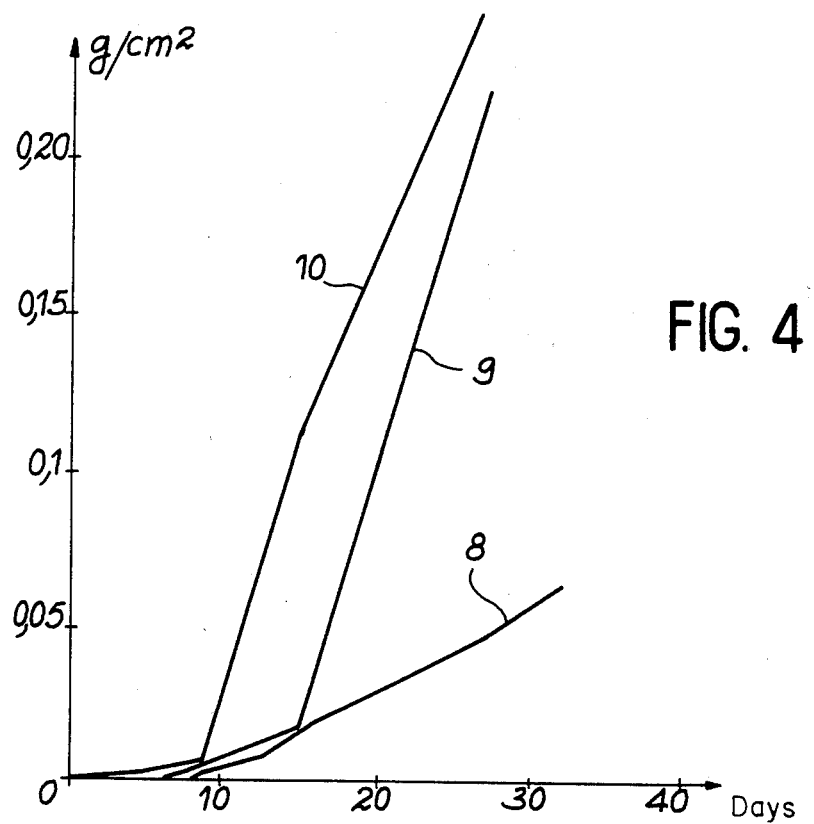
Figure 5:
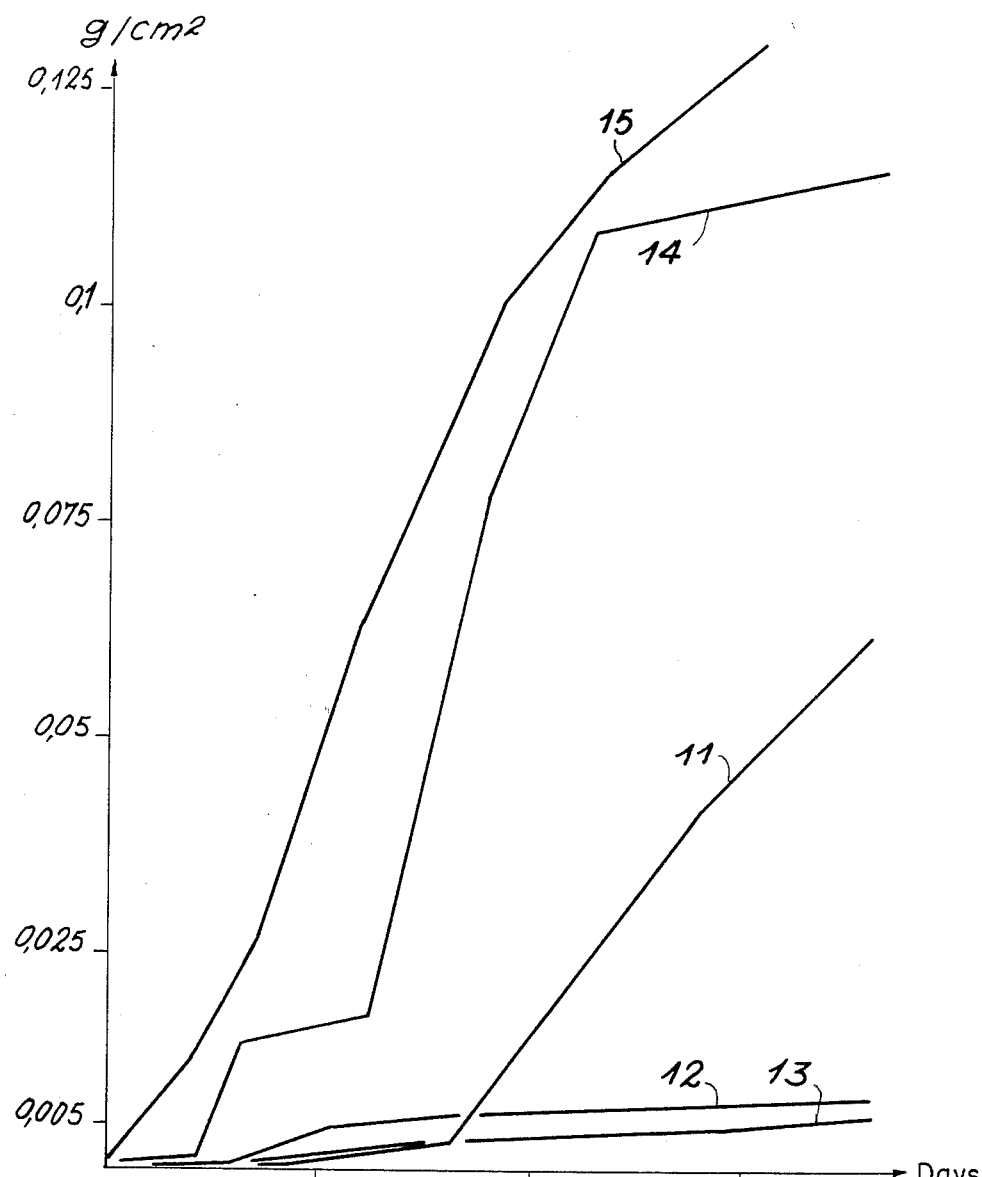

Pots containing 4.5 g of monobasic potassium phosphate are prepared using diaphragms made from polyethylene grafted with 50% acrylic acid and identical to those of Example 3. They only constitute the upper part of the pot, which corresponds to a diaphragm surface of 3.9 cm$^2$. After sealing, the properties of the containers are checked by carrying out desorption at 25° and 40° C. The results obtained are illustrated respectively by curves 5 (25° C.) and 6 (40° C.) of FIG. 3 representing the potassium phosphate quantities released (in g/cm$^2$ of diaphragm) as a function of time (in days).

EXAMPLE 5

250 g of ethylene—vinyl acetate copolymer powder with 18% vinyl acetate are immersed in an acrylic acid solution containing 73 ml of acrylic acid, 650 ml of soft water and 4.3 g of Mohr's salt (polymerization inhibitor).

The mixture is stirred under nitrogen and undergoes gamma irradiation by means of a cobalt 60 source, at a dose rate of 47,000 rad/h and an irradiation dose of 0.8 Mrad.

In this way an ethylene—vinyl acetate copolymer powder grafted with acrylic acid is obtained, whose grafting degree is 26%. This powder is brought into the form of a 0.2 mm thick diaphragm by calendering and from the thus obtained diaphragm are formed sachets containing 2.5 g of urea and having a diaphragm surface of 9 cm$^2$.

The properties of the thus obtained sachets are checked by carrying out desorption at 40° C. The results obtained are represented by curve 9 of FIG. 4, which illustrates the urea quantity released per cm$^2$ of diaphragm as a function of time (in days).

By checking the urea desorption by measuring variations in the pH-value of the water in which the urea is released on about 10 sachets, it was possible to check that the results obtained were similar, which shows that the containers according to the invention have reproducible characteristics.

EXAMPLE 6

Using a grafted copolymer identical to that of Example 5, by calendering a 0.1 mm thick film is formed and the film is brought into the form of sachets containing 2.5 g of urea with a diaphragm surface of 9 cm$^2$. The properties of the thus obtained container are checked by carrying out desorption at 40° C. The results obtained are illustrated by curve 10 of FIG. 5, which represents the urea quantity released per cm$^2$ of diaphragm as a function of time.

EXAMPLE 7

A fertilizer sachet identical to that of Example 6 is prepared and its properties checked by desorption at 25° C., instead of 40° C. The results obtained are illustrated by curve 8 of FIG. 4, which represents the urea quantity released per cm$^2$ of diaphragm as a function of time.

EXAMPLE 8

250 g of ethylene—vinyl acetate copolymer powder with 33% vinyl acetate are immersed in an acrylic acid solution consisting of 118 ml of acrylic acid, 105 ml of soft water and 7 g of Mohr's salt.

The mixture is agitated under nitrogen and undergoes gamma irradiation with cobalt 60 at a dose rate of 60,000 rad/h and an irradiation dose of 1.02 Mrad. In this way a grafting degree of 40% is obtained.

This grafted copolymer powder is brought into the form of a 0.2 mm thick diaphragm by calendering, followed by the production of sachets containing 4.5 g of monobasic potassium phosphate from said diaphragm with a surface of 15 cm$^2$. The properties of the thus obtained container are checked by carrying out desorption at 25° C. The results are illustrated by curve 7 of FIG. 3, which represents the monobasic potassium phosphate quantity released per cm$^2$ of diaphragm as a function of time in days.

EXAMPLE 9

Polyethylene powder identical to that of Example 1 is irradiated by an electron beam with an energy of 3 MeV, a beam intensity of 400 $\mu$A and an irradiation dose of 1.9 Mrad. After irradiation, the powder is immersed in an acrylic acid solution identical to that of Example 1, followed by heating to a temperature of 80° C. and this is maintained in solution for 1 hour. In this way polyethylene powder grafted with 39.5% acrylic acid is obtained.

From this powder is prepared a 0.2 mm thick diaphragm by pressure shaping at a temperature of 155° C. and a pressure of 5 bars. From this diaphragm are produced pots containing 2.5 g of urea and having a diaphragm surface of 3.9 cm$^2$. They are used in eucalyptus shoot cultivation tests. For these tests a first series $E_1$ of 24 pots of eucalyptus shoots is used and into each of these is introduced a fertilizer container, as well as a second series $E_2$ of 24 pots of eucalyptus shoots into which are introduced two fertilizer containers and a third series $E_3$ of 24 pots of eucalyptus shoots each containing three fertilizer containers. For control purposes, a fourth series $E_0$ of 24 pots of eucalyptus shoots is used into which was introduced no fertilizer container.

Cultivation was carried out under conventional conditions and the average height of the eucalyptus stems was measured after three test months. The following results are obtained:

Series $E_0$: 17.2 mm
Series $E_1$: 40.1 mm
Series $E_2$: 44.1 mm
Series $E_3$: 55 mm These results show that the diaphragms are effective and enable the fertilizer to be released over periods of several months.

Moreover, these examples make it clear that the quantity and duration of fertilizer desorption are dependent on the nature of the diaphragm, its thickness and the relationship between the surface of the diaphragm and the fertilizer quantity present in the container, which permits adaptation to different cultivation types.

EXAMPLE 10

This example relates to the production of a conditioning device in the form of a tube sealed at both ends, containing urea and made from ethylene vinyl acetate copolymer grafted with 40% acrylic acid.

36 kg of ethylene—vinyl acetate copolymer powder with 18% vinyl acetate are immersed in an acrylic acid solution containing 16.05 kg of acrylic acid, 111.7 kg of soft water and 0.867 kg of Mohr's salt.

Nitrogen scavenging takes place to remove the air from the mixture and it undergoes gamma irradiation using a cobalt 60 source, at a dose rate of 60,000 rad/h, an irradiation dose of 1.1 Mrad and working at a temperature of between 45° and 53° C.

After filtering, washing and drying, an ethylene—vinyl acetate copolymer powder is obtained which is grafted by acrylic acid. The grafting degree is 40%. This powder is brought into the form of a tube having 0.15 mm thick walls by extrusion and from this tube are formed sachets containing 2.5 g of urea and having a diaphragm surface of 20 cm$^2$.

The properties of the thus obtained sachets are checked, by carrying out desorption at 25° C. The results obtained are represented by curve 11 of FIG. 5, which illustrates the urea quantity released per cm$^2$ of diaphragm, as a function of time (days).

EXAMPLE 11

From the extruded tube of Example 10 are prepared sachets containing 4.5 g of monobasic potassium phosphate, with a diaphragm surface of 20 cm$^2$. The properties of the thus obtained container are checked by carrying out desorption at 25° C. The results are illustrated by curve 12 of FIG. 5, which shows the quantity of monobasic potassium phosphate released per cm$^2$ of diaphragm as a function of time.

EXAMPLE 12

From the extruded tube of Example 10 are prepared sachets containing 4.5 g of calcium nitrate with a diaphragm surface of 20 cm$^2$. The properties of the thus obtained container are checked by carrying out desorption at 25° C. The results are illustrated by curve 13 of FIG. 5, which shows the calcium nitrate quantity released per cm$^2$ of diaphragm as a function of time.

EXAMPLE 13

Starting with a grafted copolymer identical to that of Example 10, a tube is formed by extrusion with two mm thick walls, from which sachets containing 4.5 g of monobasic potassium phosphate and 2 ml of ammonia with 20 to 21% NH₃ are produced having a diaphragm surface of 20 cm². The properties of the thus obtained container are checked by carrying out desorption at 25° C. The results are illustrated by curve 14 of FIG. 5, which represents the quantity of monobasic potassium phosphate released per cm² of diaphragm as a function of time.

EXAMPLE 14

From the extruded tube of Example 13 are prepared sachets containing 4.5 g of calcium nitrate and 2 ml of ammonia with 20 to 21 NH₃, with a diaphragm surface of 20 cm². The properties of the thus obtained container are checked by carrying out desorption at 25° C. The results are illustrated by curve 15 of FIG. 5, which represents the calcium nitrate quantity released per cm² of diaphragm as a function of time.

The conditions and curves relating to Examples 10 to 14 in which the conditioning device is a diaphragm extruded in the form of a tube, produced from ethylene—vinyl acetate copolymer, with 18% vinyl acetate and grafted with 40% acrylic acid, are given in the following table.

TABLE

| Example No. | Curve No. | Diaphragm thickness | Fertilizer |
|---|---|---|---|
| 10 | 11 | 0.15 mm | 2.5 g urea |
| 11 | 12 | 0.15 mm | 4.5 g KH₂PO₄ |
| 12 | 13 | 0.15 mm | 4.5 g Ca(NO₃)₂ |
| 13 | 14 | 0.2 mm | 4.5 g KH₂PO₄ +2 ml NH₄OH |
| 14 | 15 | 0.2 mm | 4.5 g Ca(NO₃)₂ +2 ml NH₄OH |

What is claimed is:

1. A device for conditioning hydrosoluble fertilizers and/or hydrosoluble products usable in agriculture comprising a sealed container having a plurality of walls, at least one of the walls comprising a membrane having a thickness of about 0.1 to about 0.2 mm said membrane being formed of a grafted polymer powder comprising a hydrophobic polymer powder selected from the group consisting of a polyolefin and an ethylene vinyl acetate copolymer, said hydrophobic polymer powder being grafted by hydrophilic monomers selected from the group consisting of acrylic acid and vinyl pyrrolidone, the amount of grafted hydrophilic monomers being 25 to 50% based on the weight of said hydrophobic polymer, said grafted polymer powder being shaped to provide said membrane and to form said container, said container containing the fertilizers and/or hydrosoluble products, and said membrane passing said fertilizers and/or hydrosoluble products at a daily rate of at least 1,000 μg/cm² based on the area of the membrane.

2. A device according to claim 1, wherein the polyolefin is polyethylene or polypropylene.

3. A device according to claim 1, wherein the membrane is an ethylene-vinyl acetate copolymer grafted by acrylic acid.

4. A device according to claim 1, wherein the membrane is made from polyethylene grafted by acrylic acid.

5. A device according to claim 1, wherein the fertilizer is based on phosphate or nitrate and the device also contains ammonia in aqueous solution.

6. A device according to claim 1, wherein the hydrophobic polymer grafted by the hydrophilic monomers is a powder having a grain size of 5 to 1,000 μm and the membrane is provided by hot forming said grafted polymer powder to provide said membrane with a uniform dispersion of the grafted monomers through the thickness of the membrane.

7. A device according to claim 6, wherein said membrane passes said fertilizers or hydrosoluble products at a daily rate of 2,000 μg/cm² based on the area of the membrane.

8. A process for the preparation of an agricultural device for conditioning hydrosoluble fertilizers and/or hydrosoluble products, said device comprising a sealed container having a plurality of walls for containing said hydrosoluble fertilizers and/or hydrosoluble products, at least one of the walls being provided by a membrane, comprising the steps of providing a hydrophobic polymer powder selected from the group consisting of a polyolefin and an etyhylene vinyl acetate copolymer, grafting said hydrophobic polymer powder with hydrophilic monomers selected from the group consisting of acrylic acid and vinyl pyrrolidone, the amount of grafted hydrophilic monomers being 25 to 50% based on the weight of said hydrophobic polymer, hot shaping said grafted polymer powder to provide said membrane and to form said container, and enclosing and sealing said hydrosoluble fertilizers and/or hydrosoluble products within said container, said membrane having a thickness of about 0.1 to about 0.2 mm and passing said hydrosoluble fertilizers and/or hydrosoluble products at a daily rate of at least 1,000 μg/cm² based on the area of the membrane.

9. A process according to claim 8, wherein the grafted hydrophobic polymer powder is prepared by exposing a hydrophobic polymer powder to irradiation by ionizing rays and then immersing the thus irradiated powder in a solution of hydrophilic monomers containing a polymerization inhibitor.

10. A process according to claim 8, wherein the grafted hydrophobic polymer powder is prepared by exposing a hydrophobic polymer powder immersed in a hydrophilic monomer solution containing a polymerization inhibitor to irradiation by means of ionizing rays.

11. A process according to claim 8, wherein the step of grafting said hydrophobic polymer powder includes irradiation carried out by means of gamma radiation or accelerated electron beam.

12. A process according to claim 8, wherein after shaping, said membrane undergoes cross-linking by means of ionizing rays.

* * * * *